United States Patent [19]
Griffin

[11] 3,800,898
[45] Apr. 2, 1974

[54] ELECTRICALLY POWERED BICYCLE

[76] Inventor: Donald R. Griffin, 5229 Pinecrest Dr., Covington, Ga. 30209

[22] Filed: May 17, 1972

[21] Appl. No.: 253,929

[52] U.S. Cl............................ 180/31, 180/34, 180/65
[51] Int. Cl.............................................. B62d 61/00
[58] Field of Search............................ 180/31, 34, 65

[56] References Cited
UNITED STATES PATENTS

| | | | |
|---|---|---|---|
| 3,096,841 | 7/1963 | May | 180/31 X |
| 3,199,623 | 8/1965 | Mangum | 180/31 |
| 3,431,994 | 3/1969 | Wood | 180/31 |
| 3,506,080 | 4/1970 | Hott | 180/65 R X |

Primary Examiner—Richard A. Schacher
Attorney, Agent, or Firm—Newton, Hopkins & Ormsby

[57] ABSTRACT

An electrically powered bicycle having a frame support means with a front steerable wheel and a rear wheel, and wherein electric motor drive means is drivingly connected to the front steerable wheel. The electric motor is supplied with power from a pair of storage batteries, one supported adjacent each side of the axis of the rear wheel and includes selectively operable control means for transferring the power from the storage batteries to the electric motor for effecting rotary driving movement of the front steerable wheel.

5 Claims, 1 Drawing Figure

PATENTED APR 2 1974 3,800,898

ELECTRICALLY POWERED BICYCLE

BACKGROUND OF THE INVENTION

This invention relates to a bicycle and is more particularly concerned with an electrically powered bicycle having a motor drivingly connected to the front steerable wheel means.

There have been a number of attempts to construct a bicycle which is powered by electric motor means. However, the prior art electric powered bicycle normally supports the motor and drive on the frame such that the drive is delivered to the rear wheel means. These prior art bicycle constructions are complex and expensive to manufacture.

A number of front wheel electric powered bicycles have been constructed utilizing a special electric motor coaxially mounted relative to the front wheel. These specially constructed electric motors are complex and unreliable in performance.

SUMMARY OF THE INVENTION

The above disadvantages have been overcome by the present invention which basically includes a bicycle having a frame and rear wheel means and including a front steerable wheel driven by an electric motor supported on the front steerable wheel frame means.

It is therefore a primary object of the present invention to provide an electrically powered bicycle which is simple in construction, economical to manufacture and reliable in performance.

Another object of the present invention is to provide an electrically powered bicycle wherein the electric motor and storage supply means are detailed in location for maximum balance and for providing a low center of gravity.

A further object of the present invention is to provide an improved fork member for use on a bicycle frame wherein the fork is capable of supporting an electric motor and drive transfer means to a front steerable wheel.

These and other objects and advantages of the details of construction will become apparent after reading the following description of the illustrative embodiment with reference to the attached drawings wherein like reference numerals have been used to refer to like parts throughout the several figures, and wherein:

DESCRIPTION OF THE ILLUSTRATIVE EMBODIMENT

Figure 1:
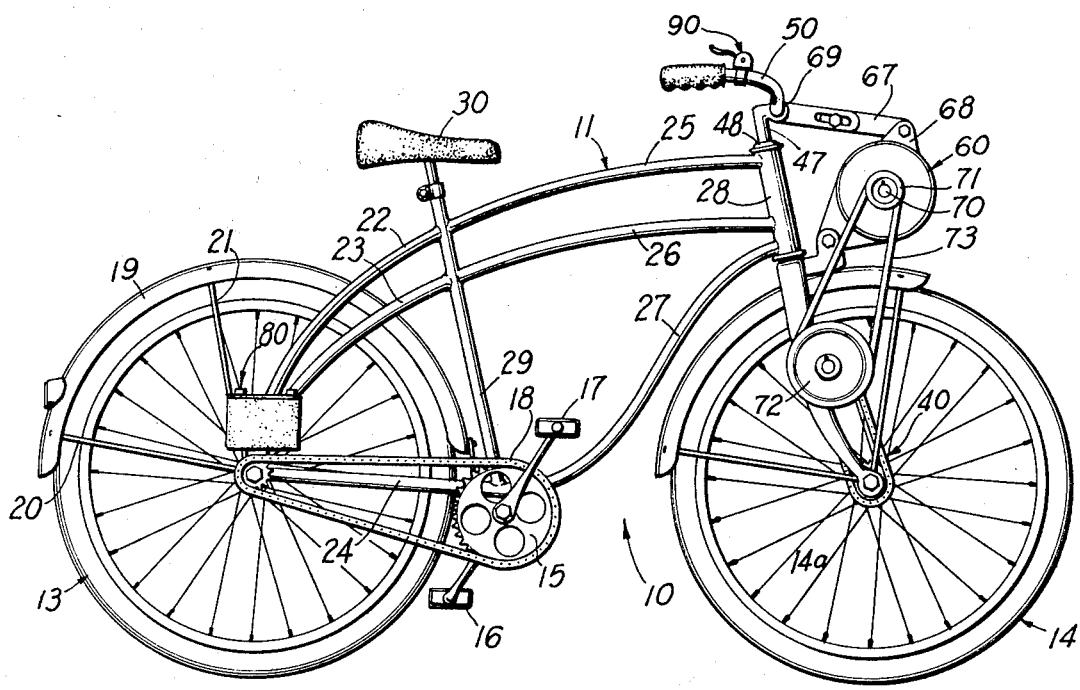
FIG. 1 is a side elevational view of an electrically powered bicycle embodying the principles of the present invention.

Referring now to the drawing, the electrically powered bicycle embodying the principles of the present invention is shown and generally represented by the reference numeral 10. Bicycle 10 includes a conventional frame support means 11 having a rear wheel 13 and a front wheel 14. Frame 11 is provided with a number of rearwardly extending frame elements 22, 23 and 24 which are integrally connected to each other adjacent their rearwardly extended end in a conventional manner to provide coaxially aligned openings (not shown) for receiving the rear wheel axle means. Frames 11 also include a number of forwardly extending frame elements 25, 26 and 27 which are connected to a sleeve member 28. Supported intermediate rear frame members 22 to 24 and front frame members 25 to 27 is a vertically extending frame member 29 which provides a support for a conventional bicycle seat means 30.

Rear wheel 13 includes a conventional supporting axle shaft, drive sprocket and brake means (not shown) all of which are secured in a set position to the rearwardly extending frame members 24 to 26 for rotation in a vertical plane. Bicycle 10 includes a conventional drive sprocket 15 having a pair of pedal means 16, 17. Sprocket 15 includes a conventional drive chain connected to the rear wheel sprocket so that sprocket 15 and pedal means 16, 17 can be utilized to effect driving movement to rear wheel 13 and can be utilized in operating the rear wheel brake means. Rear wheel 13 is provided with a conventional fender means 19 having a number of fender supporting frame members 20 and 21 which are fixed to the frame coaxially with the rear wheel axle mounting means.

Figure 2:
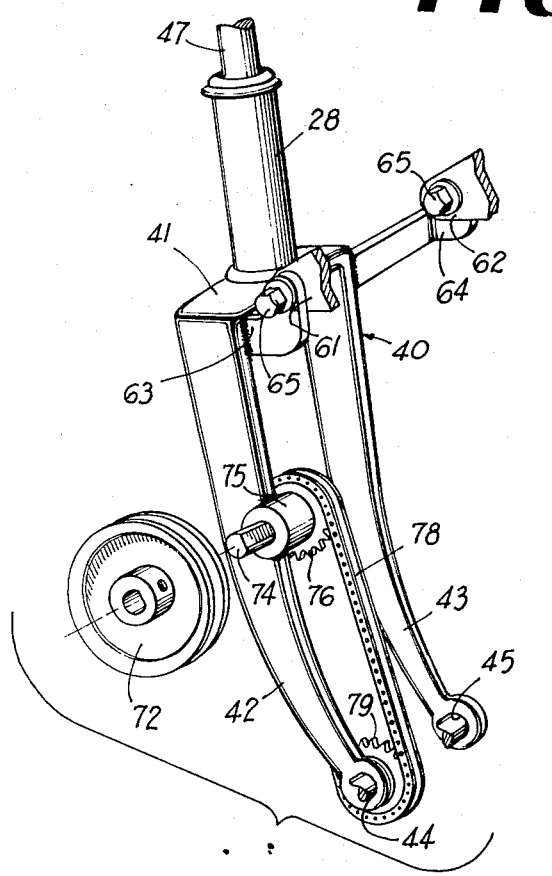
FIG. 2 is an enlarged fragmentary perspective view showing a front fork member utilized in the bicycle shown in FIG. 1.
Figure 3:
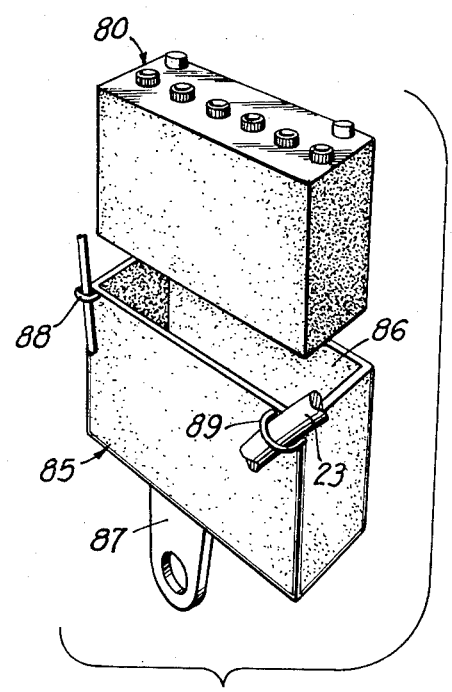
FIG. 3 is an enlarged perspective view of a storage battery support means.

As shown in FIGS. 1 and 2, front wheel 14 is supported for rotary movement in a vertical plane by a steerable fork member 40. Steerable fork member 40 includes an upper horizontal frame portion 41 and a pair of downwardly extending leg members 42, 43. The extended ends of leg members 42, 43 are provided with coaxially aligned openings 44, 45, respectively, which are adapted to receive the axle of the front wheel means 14. Connected to an intermediate portion of horizontal frame member 41 is an upwardly extending support shaft 47 which is adapted to be rotatably received within sleeve 28. Shaft 47 is adapted to be secured for rotary movement relative to sleeve 28 by a conventional attachment collar 48. An upper extended end of shaft 47 is provided with conventional bicycle handlebar means 50. The handlebar means 50 is operable for effecting pivotal movement of fork 40 within collar 48 whereby the front wheel 14 can steer the bicycle 10 in a riding operation.

As shown in FIGS. 1 and 2, the front steerable fork 40 is provided with an electric motor drive means 60. Motor 60 includes a number of mounting brackets 61, 62. Mounting brackets 61, 62 are pivotally attached to a pair of horizontally spaced brackets 63, 64. Brackets 63, 64 are attached to fork member 40 to define coaxially aligned openings (not shown) for receiving conventional connecting bolt means 65 for pivotally attaching motor 60 to the front fork member 40. Motor 60 is secured in a set position relative to the axes of the connecting bolt means 65 by means of a link member 67. Link 67 is connected adjacent one end by conventional bolt connecting means to an upstanding bracket 68 formed on the motor housing. An opposite end of link 67 is connected by conventional connecting bolt means to the handlebar support bracket 69. Link 67 is provided with conventional slotted openings and bolt connecting means so that motor 60 can be secured in a number of adjusted positions. Motor 60 includes an output drive shaft 70 fixed to a conventional pulley 71. Drive from pulley 71 is delivered to pulley 72 by means of a belt 73. Pulley 72 is fixed to a jack shaft 74 which is supported for rotation in a sleeve member 75. Sleeve 75 is fixed by conventional means, such as welding (not shown) to an intermediate portion of forked leg member 42, as shown in FIG. 2. An opposite end of jack shaft 74 is provided with a sprocket 76. Sprocket 76 is provided with a conventional drive chain 78 which is operatively connected to a front wheel sprocket 79. Sprocket 79 is fixed to front wheel shaft 14a such that rotation of sprocket 79 will effect corresponding rotation of front wheel 14.

Power for motor 60 is supplied by a pair of conventional storage batteries, only one of which is shown in FIG. 1 and generally represented by the reference numeral 80. Storage batteries 80 are supported adjacent opposite sides of rear wheel 13 by means of a rectangular shaped casing 85 having an upwardly opened cavity 86. Casing 85 is provided with a downwardly extending bracket 87 having an opening formed therein for receiving the rear wheel axle shaft, with the bracket being secured in a set position relative to the rear wheel axle shaft by conventional bolt connecting means (not shown). Casing 85 is provided with a pair of integrally formed hook members 88, 89. Hook member 88 is adapted to be connected around rear fender supporting frame member 21 and hook member 89 is adapted to be connected around rearwardly extending frame member 23. In mounting casing 85 on the bicycle frame means 11, the hook members 88, 89 are first inserted around frame elements 21, 23, respectively, and bracket 87 is then inserted over the rear wheel axle shaft and the rear wheel shaft bolt means is inserted thereon to secure the battery casing 85 in a fixed position relative to the bicycle frame means 11.

The power from storage batteries 80 is transferred to motor 60 through conventional supply lines (not shown) which are adapted to be run through the bicycle frame members. Power from storage batteries 80 to motor 60 is controlled in an "on" and "off" driving relationship by means of a conventional electrically operable control switch 90 which is supported on the handlebar means 50, as shown in FIG. 1.

The storage batteries 80 are supported in detailed location relative to the opposite sides of rear wheel 13 such that they are evenly balanced on the bicycle frame means and are located relative to the axis of the rear wheel means 13 to provide a low center of gravity. Electric motor drive means 60, including the drive transfer pulleys 70, belt 73, pulley 72, jack shaft 74, sleeve 75, sprocket 76 and chain 78 are detailed in location so that the weight of the motor and drive transfer means are evenly disposed on opposite sides of the vertical plane of the frame and front wheel means 14 to give an optimum balanced condition to the bicycle and drive means.

It now becomes apparent that the above described illustrative embodiment of an electrically powered bicycle is capable of obtaining the above stated objects and advantages. It is obvious that those skilled in the art may make modifications in the details of construction without departing from the spirit of the invention which is to be limited only by the scope of the appended claims.

What is claimed is:

1. An electrically powered bicycle comprising in combination frame support means, a rear wheel supported by said means for rotation in a vertical plane, a substantially vertical sleeve rigidly connected at the front of said frame support means, a steerable member pivotally supported in said sleeve and having a handlebar support bracket above said sleeve and a wheel receiving fork below it, a front wheel supported on a horizontal axis at the lower end of said fork, a front wheel drive element mounted on said axis, an electric motor, bracket means secured to said fork immediately below said sleeve, connecting means pivotally supporting said motor on said bracket means at the lower portion of said motor, a first link pivotally connected to the upper portion of said motor, and a second link pivotally connected to the handlebar supporting bracket, said links being provided with longitudinal overlapping slots, connecting means received in said slots for holding said links in adjusted positions, a jack shaft rotatably carried by said fork and including a pair of axially spaced drive elements, first drive means for connecting said motor to one of said drive elements and second drive means for connecting the other drive element to said front wheel drive element, so that operation of said motor will effect rotation of said front wheel.

2. An electrically powered bicycle as defined in claim 1 further characterized in that said electric motor includes a pulley and wherein one of said drive elements on said jack shaft includes a pulley aligned with said motor pulley and said first drive means including a belt for transferring rotary movement from said motor to said jack shaft, said other jack shaft drive element including a sprocket, with the drive element on said front wheel including an aligned sprocket, and wherein said second drive means includes a chain member operatively connecting said sprockets.

3. An electrically powered bicycle as defined in claim 2 further characterized in that said fork member includes handlebar means having a pair of outwardly extending handle guide members, with one of said handle guide members being provided with a control switch for effecting selected operation of said electric motor means.

4. An electrically powered bicycle as defined in claim 1 further characterized in that said bicycle includes two battery means, one mounted on each side of and adjacent the axis of said rear wheel, with said battery means being operatively connected to said electric motor means.

5. An electrically powered bicycle as defined in claim 1 further characterized in that said frame support means includes a rotatable sprocket having a pair of foot pedal means for effecting rotation of said sprocket, and wherein said sprocket is connected by a chain drive to a sprocket coaxially fixed to said rear wheel, whereby said foot pedal means can be operated for effecting rotary movement of said rear wheel.

* * * * *